United States Patent [19]

Davis

[11] Patent Number: 4,497,017
[45] Date of Patent: Jan. 29, 1985

[54] SWITCHING REGULATOR OFF-LINE STARTING CIRCUIT

[75] Inventor: Walter R. Davis, Sunnyvale, Calif.

[73] Assignee: National Semiconductor Corporation, Santa Clara, Calif.

[21] Appl. No.: 495,201

[22] Filed: May 16, 1983

[51] Int. Cl.³ .............................................. H02P 1/00
[52] U.S. Cl. ........................................ 363/49; 363/21
[58] Field of Search ..................... 363/21, 49; 323/901

[56] References Cited

U.S. PATENT DOCUMENTS 4,246,634  1/1981  Purol ..................................... 323/901
4,277,824  7/1981  Alberkrack ........................... 363/49

FOREIGN PATENT DOCUMENTS 53182  4/1980  Japan ..................................... 363/21

OTHER PUBLICATIONS

Moorman, "Transistor Switching Regulator Start Circuit," IBM Tech. Discl. Bul., vol. 13, No. 9, pp. 2763, 2764, Feb. 1971.

Biamonte et al., "Transistor Switching Regulator Starting and Monitoring," IBM Tech. Discl. Bul., vol. 23, No. 12, pp. 5449-5451, May 1981.

Primary Examiner—William H. Beha, Jr.
Attorney, Agent, or Firm—Gail W. Woodward; Paul J. Winters; Michael J. Pollock

[57] ABSTRACT

A switching regulator is provided with a separate or isolated d-c output for operating the switching pulse generating circuits. A large value resistor coupled between the d-c input line and the isolated d-c output will charge the filter capacitor to a higher than normal voltage. A zener diode string is coupled across the filter capacitor. The zener diodes in combination have a higher than nominal zener voltage. The diodes will respond to the capacitor voltage and develop a starting pulse that initiates the power supply when it is first energized.

8 Claims, 3 Drawing Figures

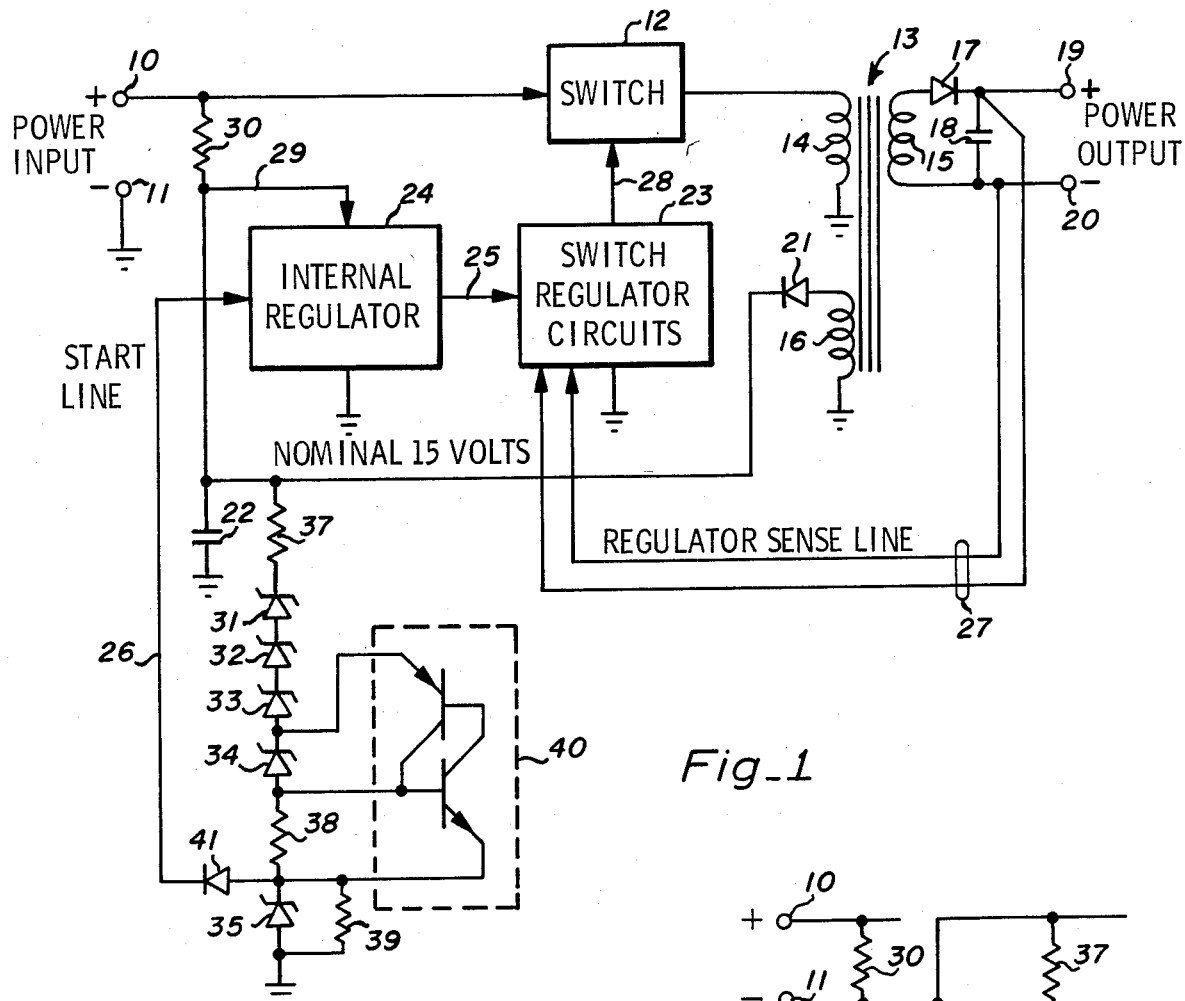
Fig_1
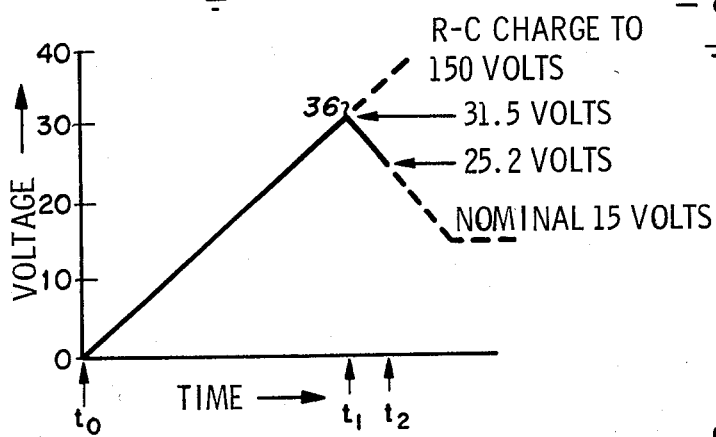
Fig_2
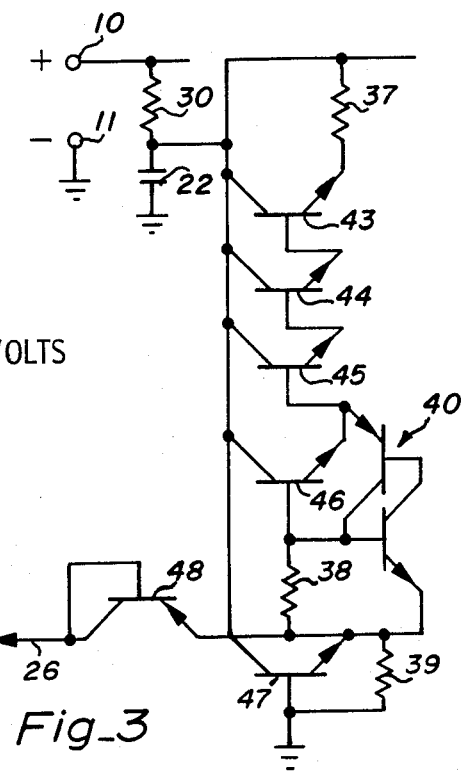
Fig_3

SWITCHING REGULATOR OFF-LINE STARTING CIRCUIT

BACKGROUND OF THE INVENTION

The invention relates to power-line connected switching regulators, commonly known as off-line switching regulators. Ordinarily a full-wave bridge rectifier converts the a-c line voltage to pulsating dc which is partly filtered and then applied to a switching regulator that controls the energy fed into a transformer, the secondary of which supplies an a-c signal to a rectifier at a suitable voltage level. This a-c signal is rectified and applied to a filter capacitor that provide a d-c output. Since the switching regulator operates at a relatively high frequency, the transformer and filter capacitor components can be made very efficient and relatively small. Whereas, normal power supplies operate at 60 Hz for half wave off-line operation, and at 120 Hz for full wave operation, such frequencies require transformers having substantial sized iron cores and filter capacitors that are quite large, perhaps several thousand microfarads. When a switching regulator is made to operate at 600 KHz it can be seen that the filter capacitor size can be reduced by about four orders of magnitude over the 60 Hz case. The transformer iron core can similarly be reduced and small low-loss ferrite cores can be employed. Such power supplies commonly employ a timing oscillator that can either be synchronized or made a part of a phase locked loop (PLL) for control and stability. The timing oscillator is used to generate a ramp voltage that is compared with the rectified d-c supply output and the resultant information used to modulate the width of a pulse that is fed to a switch that controls the flow of energy to the power supply transformer. When the d-c output rises the regulator acts to reduce the switch duty cycle which acts to reduce the output. When the d-c output falls the regulator increases the duty cycle which raises the output. Thus a change in duty cycle at a constant frequency acts to regulate the d-c output. Such switching regulator circuits can become relatively complicated so that they are ordinarily in integrated circuit (IC) form. The IC must be supplied with a d-c voltage in order to operate and this commonly is achieved by powering the IC from the power supply d-c output. However, such circuits are not self starting, they must be started separately when first energized. This is typically done by connecting a resistor from the d-c output back to the d-c power line input. This resistor must conduct sufficient current to run the IC at the lowest line voltage. Thus, the resistor value is set. Then at the highest power line voltages the resistor must be capable of dissipating the required power so its power rating is set. These requirements result in a relatively low value resistor having a relatively high dissipation. In other words the resistor gets hot and a high wattage rating is involved. Any such power dissipated is wasted so such starting is regarded as undesirable.

SUMMARY OF THE INVENTION

It is an object of the invention to develop a starting circuit for a switching regulator circuit employing a high value resistor which dissipates little power.

It is a further object of the invention to operate the IC associated with a switching regulator from an isolated power supply capacitor which can be charged from the d-c input using a high value resistor.

It is a still further object of the invention to provide an on-chip starting circuit in a switching regulator IC wherein a capacitor charge is sensed and a starting pulse generated when the charge reaches a predetermined value.

These and other objects are achieved in a circuit configured in the following manner. A switching regulator is provided with a separate transformer winding that develops an a-c output at a suitable level which when peak rectified will properly energize an IC. The rectifier charges a filter capacitor which is thus isolated from the regulator which has a conventional d-c output at the required design level as determined by the application. The voltage across the isolated capacitor is coupled to operate the IC at its desired level—for example at about 15 volts. The capacitor is returned to the d-c input line through a high value resistor that will dissipate very little power. When the regulator is first connected to the d-c input line there will be no d-c output and the regulator will not self start. However, the isolated capacitor will charge through the resistor. The starting circuit consists of a series connected string of zener diodes that have a combined zener voltage that substantially exceeds the nominal capacitor operating voltage. The zener diode string includes a pair of series dropping resistors and a latching trigger circuit connected across one of the zener diodes. The latch input is connected across one of the series resistors. During the first part of the capacitor charge where the voltage is below the zener level no current will flow in the diodes. However, then the capacitor charge reaches the zener level, current will begin to flow. When the voltage across the latch input resistor reaches its trigger level the latch will turn on thus shorting out the parallel connected zener diode. This produces a current surge in the series zener string. The current surge is coupled to the IC so that it will start operating from the stored energy in the capacitor and the switching regulator will become functional. The value of the capacitor is selected so as to provide a discharge time that is sufficient to ensure reliable starting of the regulator. Once the regulator starts operating, the isolated capacitor will be charged from the transformer winding at a level below the zener voltage.

BRIEF DESCRIPTION OF THE DRAWING

FIG. 1 is a schematic-block diagram of a switching regulator showing the details of the invention.

FIG. 2 is a graph showing the operation of the circuit of FIG. 1.

FIG. 3 is a schematic diagram of the preferred form of zener diode connection using NPN transistors.

DESCRIPTION OF THE INVENTION

With reference to FIG. 1 a switching regulator is shown. It has a nominal d-c input at +terminal 10 and −terminal 11. This will ordinarily be the rectified and partially filtered output of a 110 volt power line. Typically a full wave bridge rectifier (not shown) is employed so that the nominal input is 150 volts (peak) minimum under low line voltage conditions, but it can be as high as a maximum of 190 volts under high line conditions. This partially filtered voltage has a substantial ripple component that will be removed by the action of the regulator circuit.

The object of the switching regulator is to operate the circuit at a high switching frequency so that relatively small filter capacitors and small but efficient transformers (or inductors) can be employed. To this end a high switching rate is desired. However, since the circuit may involve substantial power transfer, the switching device must be a high power device which limits the upper frequency capability. It is common to employ switching rates in the 20 to 500 kHz range for 50-100 watt supplies. The switch 12 may be a power transistor or a power MOSFET which is employed to switch the current in transformer 13. Winding 14 has its current flow switched off and on. Output winding 15 provides a suitable voltage that is rectified by diode 17 and filtered by capacitor 18 to provide a d-c output voltage at terminals 19 and 20. This output is dictated by the power supply application and can be chosen by the user. for example 5 volts is a widely used voltage. At a 10-ampere rating this is a 50 watt supply.

In the present invention an additional winding 16 on transformer 13 is coupled to diode 21 which acts to charge isolated capacitor 22 which is typically charged to a nominal 15 volts. This voltage is coupled via line 29 to regulator 24 which acts to operate the IC switch regulator circuits 23. This on board regulator 24 receives an input via line 29 and supplies the switch regulator circuits via line 25. It is characterized in that it will not start without a starting input pulse on line 26. The switch regulator circuits 23 receive a sense input on line 27 and provide a pulse width modulated pulse on line 28 to operate switch 12. Since the circuits in blocks 23 and 24 are functionally conventional, and well known in the switching regulator art, they will not be described in further detail herein.

The heart of the turn on circuit is capacitor 22 which is isolated from the main power supply d-c output. Resistor 30 returns capacitor 22 to the d-c input at terminal 10. The value of resistor 30 is made relatively large so that capacitor 22 will charge slowly towards a minimum of 150 volts. When the circuit is first powered up, at $t_0$, capacitor 22 will be charged as indicated by the graph in FIG. 2. As shown, the initial charge will be relatively linear because resistor 30 acts as a current source.

A series string of five zener diodes 31-35 is coupled across capacitor 22. Preferably these diodes are obtained from the emitter-base junctions of conventional IC NPN transistors. These diodes typically break down at about 6.3 volts so the series string illustrated will break down at 31.5 volts. This is point 36 of the graph of FIG. 2. The series zener diode string also contains resistors 37-39. Once the zener diodes begin to conduct there will be a current flow that will start to discharge capacitor 22. This current will flow in resistors 37 and 38. The resultant voltage drop across resistor 38 will energize latch 40 which thereupon conducts and effectively shorts out zener diode 34 and resistor 38. This shorting action produces a current surge in the series diode string so that diode 41 will couple a start pulse via line 26 to regulator 24. This will supply the switch regulator circuits 23 and 24, with current from the stored energy in capacitor 22. Switch 12 will begin to operate and an output voltage will appear at terminals 19-20. At this point the conventional regulator action will take over control of the circuit. As shown in the FIG. 2 graph, the voltage on capacitor 22 will decay to the 15 volt level provided by transformer winding 16 and diode 21.

The interval labeled $t_1$ to $t_2$ in FIG. 2 is the time during which the regulator will start. Its duration is a function of the value capacitor 22 because the discharge current supplies the nominal current required by the switching IC (blocks 24 and 23) as supplied through path 29. The voltage change during this interval is also approximately linear because the IC nominal current is relatively constant. When the capacitor voltage drops to about 25.2 volts (the voltage drops across the four zener diodes 31-33 and 35) the zeners will become nonconductive. It is assumed by the time $t_2$ the regulator circuit will have started and the components can be selected that such a start up has a very high probability. However, in the event that start up has not taken place, the charge on capacitor 22 will resume again due to charging current in resistor 30. When the charge again reaches the 31.5 volt level the zener conduction will start again and a start pulse delivered to regulator 24. This action will repeat until the regulator starts.

Latch 40 is shown as a PNP and an NPN transistor coupled together in latching configuration. The latch will turn on when the voltage drop across resistor 38 is sufficient to turn the NPN transistor on. The voltage drop when on is $V_{BE}+V_{SAT}$. This voltage is small relative to the zener voltage. The latch will turn off when the NPN emitter to PNP emitter voltage falls below one $V_{BE}$ or when the current drops to zero. If desired latch 40 could be replaced with an SCR.

FIG. 3 is a schematic diagram of a preferred starting circuit. Where the parts are the same as those of FIG. 1 the same numbers are used. The zener diodes are created from the emitter-base diodes of NPN transistors 43-47. These diodes are coupled in series with resistors 37 and 38 across capacitor 22. The transistor collectors are all returned to capacitor 22 so that they are nominally reverse biased. Thus transistors 43-47 could all be located in a single isolated expitaxial material tub in the IC topography. Transistor 48 is a diode connected lateral PNP transistor that performs the diode 41 function of FIG. 1.

EXAMPLE

The regulator circuit of FIG. 1 was constructed using the circuit example of FIG. 3. The IC was of the conventional monolithic silicon P-N junction isolated form. The following component values were employed:

| COMPONENT | VALUE | UNITS |
| --- | --- | --- |
| Capacitor 22 | 10 | Microfarads |
| Resistor 30 | 500 | K Ohms |
| Resistors 37-39 | 10K | Ohms |

The regulator itself was designed to provide a 5 volt output at 10 amps thus providing a 50 watt capability. Transformer winding 16 and diode 21 produced a nominal 15 volts across capacitor 15. The pulses applied via line 28 had a 100 kHz frequency. The 5 volt output varied from 5.00 volts to 4.95 volts over the zero to 10 ampere range. The $t_1$ to $t_2$ interval shown in FIG. 2 was 0.5 msec and the circuit started reliably from a discharged condition typically in about 1.0 millisec.

The invention has been described and an example detailed. When a person skilled in the art reads the foregoing description, alternatives and equivalents, within the spirit and intent of the invention, will become apparent. Accordingly, it is intended that the scope of the invention be limited only by the following claims.

I claim:

1. In a switching regulator power supply having a d-c input, a level shifting transformer, a pulse width modulated switch for modulating and controlling the energy supplied from said d-c input to said transformer, an output rectifier-filter combination for supplying a d-c output, and pulse generating circuits for supplying pulse width modulated pulses to said switch whereby said d-c output can be fed to said pulse generating circuits to said d-c output, a starting circuit, for initiating operation of said power supply when it is energized, comprising:

an isolated capacitor of sufficient size to store sufficient energy to power said pulse generating circuits during a start interval;

a winding on said transformer and a series connected rectifier coupled for developing a nominal charge voltage on said isolated capacitor;

means for coupling said pulse generating circuits to be energized by said nominal charge voltage;

a first resistor coupled between said d-c input and said capacitor and having a value high enough to be incapable of operating said pulse generating circuits, said first resistor being low enough in value to charge said capacitor when said pulse generating circuits are inoperative;

a plurality of zener diodes coupled in series across said isolated capacitor with the combined zener voltage of said plurality substantially exceeding said nominal charge voltage while being a fraction of said d-c input whereby a zener current will flow when said charge on said isolated capacitor exceeds said combined zener voltage; and means responsive to the onset of said zener current for starting said pulse generating circuits.

2. The starting circuit of claim 1 wherein said means responsive to the onset of said zener current comprise:

a latch coupled across at least one of said zener diodes;

means responsive to said zener current for firing said latch thereby to create a sudden increase in said zener current; and means responsive to said sudden increase in said zener current for applying a start pulse to said pulse generating circuits.

3. The starting circuit of claim 2 wherein said means responsive to said current is a second resistor connected in series with said zener diodes and coupled to trigger said latch.

4. The starting circuit of claim 2 wherein said pulse generating circuits are operated from an associated voltage regulator so that when they are inoperative very little current drain occurs therein and said start pulse is applied to said voltage regulator.

5. The starting circuit of claim 4 wherein said means for applying a start pulse includes a series connected diode poled to pass a starting current pulse.

6. The starting circuit of claim 1 wherein each of said zener diodes is the base to emitter diode of an NPN transistor.

7. The starting circuit of claim 6 wherein the collectors of said NPN transistors are returned to said isolated capacitor thereby to be reverse biased.

8. The starting circuit of claim 7 wherein said latch is composed of a PNP transistor and an NPN transistor cross coupled in latching configuration and said second resistor is coupled between the emitter and base of one of the cross-coupled transistors.

* * * * *